Figures 1, 2:
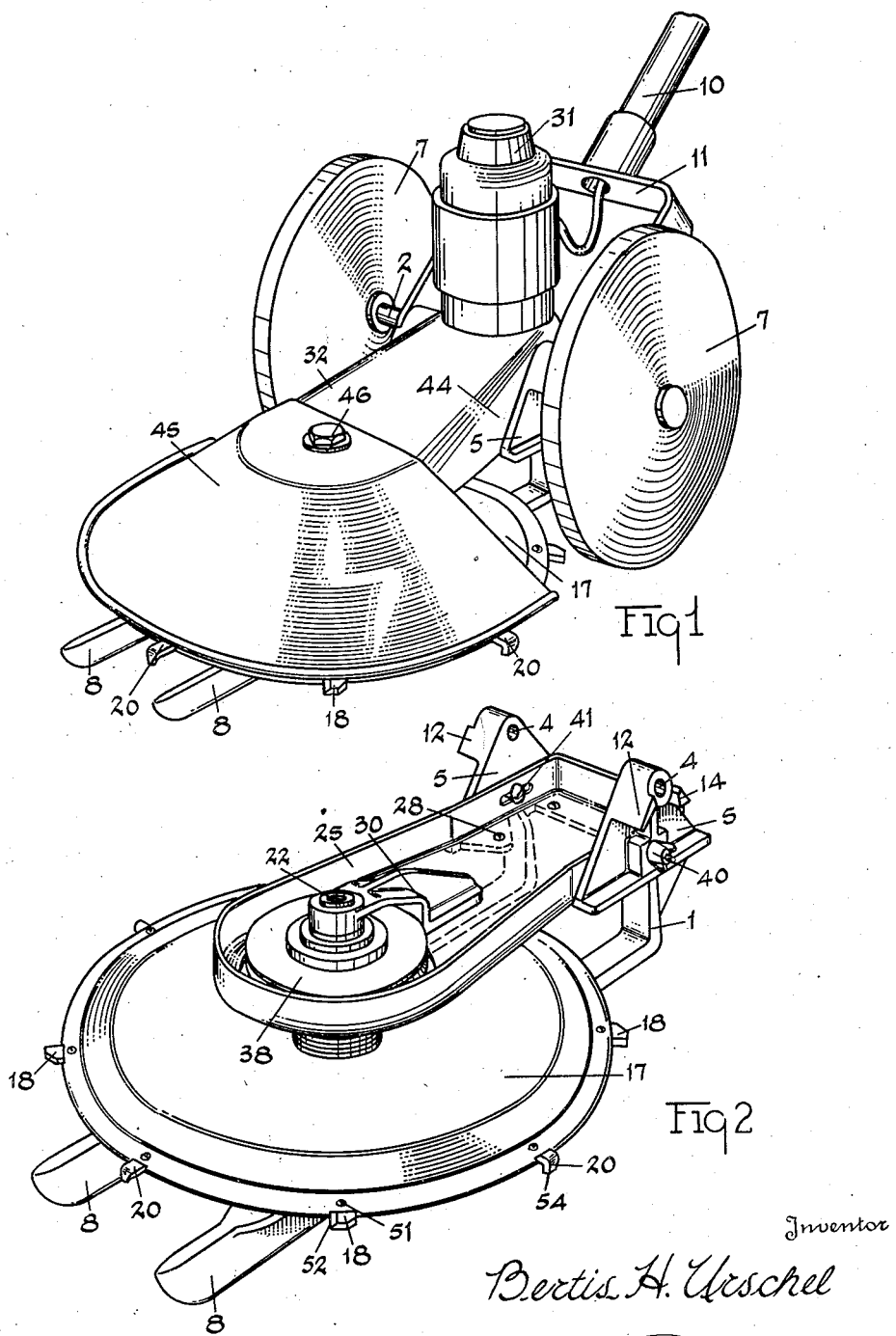

Aug. 19, 1941.   B. H. URSCHEL   2,253,452
MOWER
Original Filed July 21, 1938   3 Sheets-Sheet 1

Inventor
Bertis H. Urschel
By
Attorney

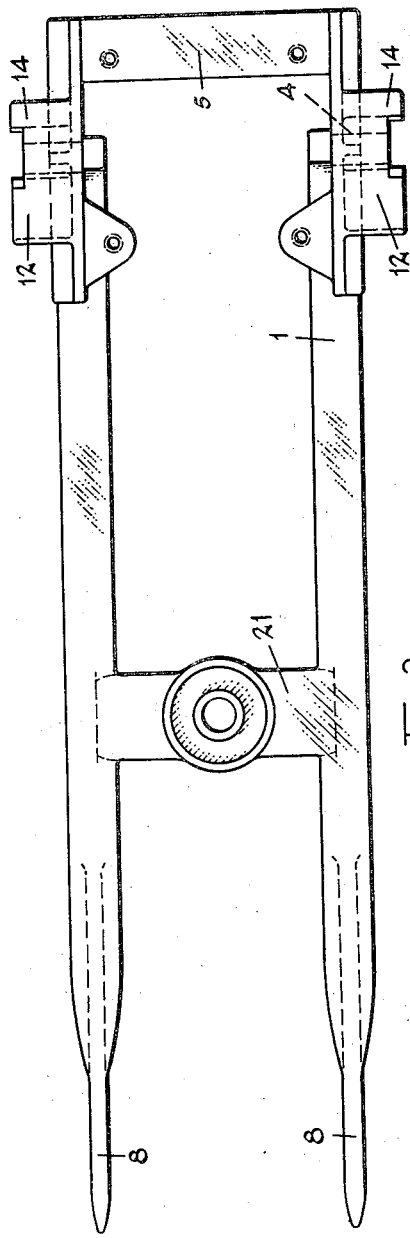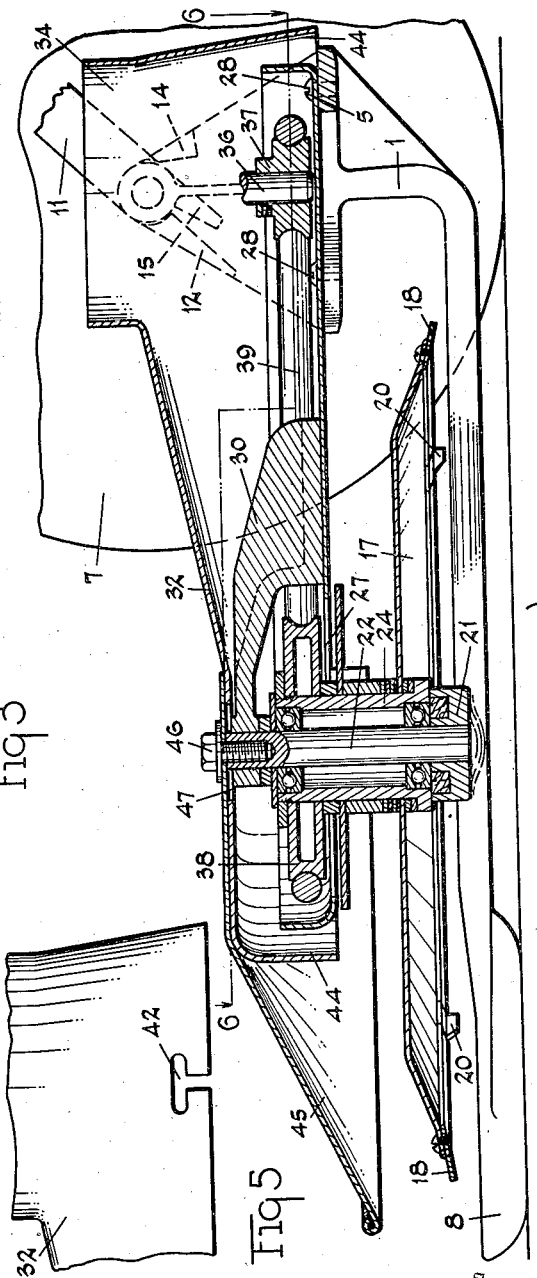

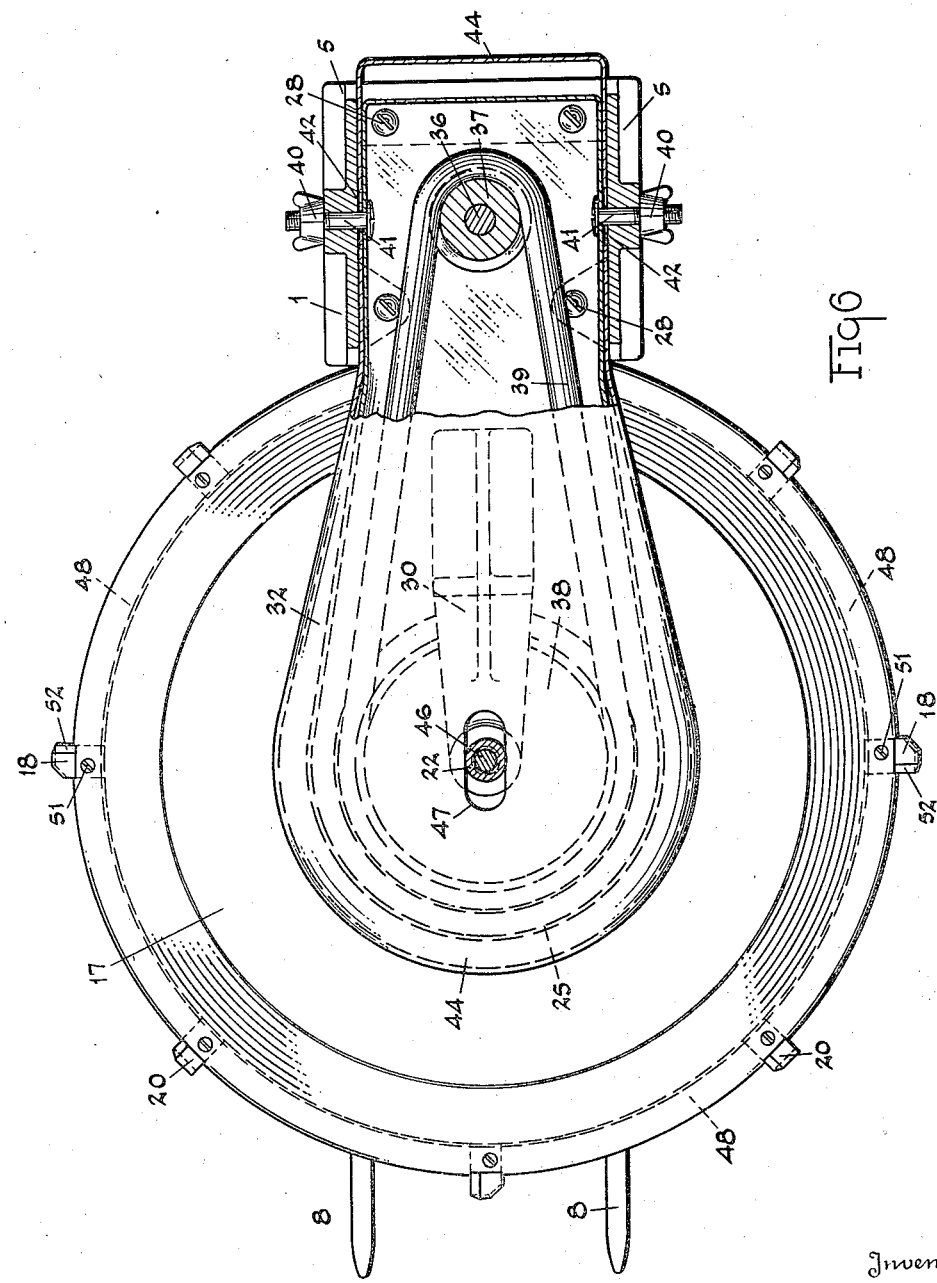

Patented Aug. 19, 1941

2,253,452

UNITED STATES PATENT OFFICE 2,253,452

MOWER

Bertis H. Urschel, Bowling Green, Ohio, assignor to The Urschel Engineering Company, Bowling Green, Ohio, a corporation of Ohio Original application July 21, 1938, Serial No. 220,521, now Patent No. 2,225,139, dated December 17, 1940. Divided and this application November 9, 1940, Serial No. 365,068

3 Claims. (Cl. 56—25.4)

My invention has for its object to provide an efficient, lightweight mower having parts that may be readily assembled and adjusted and may be made at a low cost of production.

This application is a division of application Ser. No. 220,521, filed by Bertis H. Urschel on July 21, 1938, for a Mower and granted December 17, 1940, as Patent No. 2,225,139.

The invention provides a cutting disc having a plurality of cutting teeth that may be moved substantially parallel to the surface of the ground or lawn and rotated at a relatively high speed, as by an electric motor, or by an internal combustion engine. The invention, also, provides a cutter disc having cutting teeth, whose cutting edges extend in lines inclined at different angles to the plane of the axis of rotation of the disc, whereby the cutting edges are moved through a plurality of kerfing planes to engage and cut bent blades of grass as the cutting teeth are rotated.

The invention, also, provides a protective means for preventing contact of the teeth with objects other than the grass. The invention, also, provides a shell for receiving the driving mechanism and a cover for closing the shell and, also, for conveniently supporting the driving motor.

The invention, also, provides a supporting frame having forwardly extending skids and side brackets, to which are connected wheels that support the rear end of the mower and to which is connected a handle for moving the mower over the ground, or, if desired, for directing the mower when self-propelled, as by a motor means.

The invention may be contained in mowers of different forms and, to illustrate a practical application of the invention, I have selected, as an example, a mower embodying the invention and shall describe the selected mower hereinafter. The mower is illustrated in the accompanying drawings.

Fig. 1 is a perspective view of the mower. Fig. 2 is a perspective view of the cutting disc, the enclosing shell, and the mower frame. Fig. 3 is a top view of the supporting frame. Fig. 4 is a view of a vertical section of the mower. Fig. 5 is a side view of the rear part of the shell cover. Fig. 6 is a view of a section, taken on the plane of the line 6—6, indicated in Fig. 4.

The mower is provided with a frame 1, to which the parts of the mower are connected or on which they are supported. The frame 1 is provided with a pair of stub axles 2 that are secured in openings 4 formed in heads or end brackets 5 connected to or formed integrally with the frame. The stub axles are secured by press-fitting the axles into the openings 4. A pair of wheels 7 are rotatably supported on the stub axles to rotatably support one end of the frame a short distance above the supporting surface, on which the wheels may be located.

The forward end of the frame terminates in a pair of runners or skids 8 and a handlebar 10 is connected, by means of a yoke 11, to the stub axles 2 for guiding the movement of the mower over the lawn. Preferably, the frame 1 is provided with a pair of stops 12 and 14 located on opposite sides of projections 15 formed on the ends of the yoke 11. When the handlebar is moved rearward, the projections 15 engage the stops 12 to tilt the mower on the axis of the stub axles 2 and, when the handlebar 10 is raised angularly, sufficient to move it through the vertical, the stops 14 are engaged by the projections 15 to support the handle upright. Thus, the mower may be not only guided by the handle, but, also, the runners or skids 8 may be lifted above objects that may be in the path of the mower.

A disc 17 is rotatably supported on the frame 1 and is provided with a plurality of teeth 18 and 20 that are secured in marginal parts of the disc. The frame 1 is provided with an integrally formed cross part 21 and a bearing member or rod 22 is secured to the cross part 21. The cross part 21 may be provided with a hole, into which the bearing member 22 may be secured by press-fitting. A ball bearing sleeve 24 is located on the bearing member 22 and is connected to the disc 17. A shell 25, having an opening 27, through which the bearing member 22 may extend, is mounted on the heads 5, by means of screws 28. A bracket member or brace 30 is welded to the bottom of the shell 25. One end of the bracket member has an opening for receiving the end of the bearing member 22, when the shell 25 is assembled onto the frame.

An electric motor 31, if desired, may be mounted on the frame 1, by means of an adjustable cover 32. The cover 32 has a flange 34 that surrounds and fits one end of the motor shell and locates the axis of the shaft 36 at right angles to a driving belt 39 of the motor. The inner end of the motor and the shaft extend between the inner ends of the stub axles. A grooved pulley wheel 37 is mounted on the lower end of the shaft 36 and a similar pulley wheel 38 is mounted on the sleeve 24. The pulley wheels are connected together by the belt 39, whereby the disc 17 is rotated by the operation of the motor. The relative sizes of the grooved wheels may be varied, according to the rate of rotation of the motor means and the desired driven speed of the disc 17.

The cover 32 is secured to the end of the bracket 30 and its sides are secured to the heads 5 of the frame 1, by means of winged nuts 40 and bolts 41 (Figs. 5 and 6), that extend through the heads 5 and T-slots 42 formed in the lower edge of the cover 32. The cover 32, thus, covers the shell 25 and fits the heads 5. The cover 32 has a flange part 44 that surrounds the shell 25. The cover 32 protrudes short distances beyond the ends of the shell 25 to provide for adjustment of the cover and the motor, relative to the mower frame, and, particularly, the distance between the wheels 37 and 38 to vary the tension of the bolt 39. The adjustments of the cover 32, relative to the shell 25, may be produced by the T-slots 42, which permits longitudinal movement of the cover 32, relative to the bolts 41.

An apron 45 extends from the top of the cover 32 and slopes toward the disc 17. The edge part of the apron 45 overhangs the edge of the disc 17 to protect the teeth 18 and 20 and prevent, to a considerable degree, contact of the teeth and the edge of the disc with objects other than the grass. Preferably, the forward edge part of the apron 45 is located above end parts of the runners or skids 8 and the skids 8 extend slightly beyond the forward edge part of the apron 45. The apron 45 is secured by a machine screw 46 located in the end of the bearing member 22 and extending through a slot 47 in the cover 32. When the apron 45 is secured by the screw 46, the screw operates, also, to rigidly secure the cover 32 to the end of the rod 22. The adjustment of the tension of the belt may be produced by loosening the screw 46 and the winged nuts 40 to release the cover 32, and, subsequent to the adjustment of the cover and the motor, the winged nuts 40 and the screw 46 are tightened to secure the cover 32 in position and the motor shaft 36 in its adjusted relation with respect to the bearing member 22.

The disc 17 is formed somewhat dished, it being concave on the lower side to dispose the marginal portion in a position that is inclined downwardly and outwardly. The outer edge of the disc 17 is slotted and the parts 48, located intermediate the slots, are folded downwardly and inwardly to form, with the body portion, seats for the cutting teeth 18 and 20. The teeth have a width substantially the same as the slots and are secured therein by suitable screws 51. The leading edges of the teeth have lateral cutting edges 52. The teeth 20 are formed to have downwardly extending portions 54 that are inclined to the body portions of the teeth 20, and, when mounted on the disc and the disc is mounted on the bearing part 22, the portions 54 extend substantially vertical, providing, thereby, cutting edges that cut depressed grass or grass inclined to the surface of the ground. Preferably, the alternate teeth are formed like the teeth 20 and the intermediate teeth are formed like the teeth 18. If desired, the cutting edges may be located in planes extending radially from the axis of the rotation of the shaft.

I claim:

1. In a mower, a frame; the frame having upwardly protruding head parts on one end of the frame and forwardly extending skids at the other end of the frame; a bearing shaft secured to the frame; a cutter disc rotatably supported on the bearing shaft and having projecting cutting blades; a motor supported on the head parts; means for connecting the cutter disc with the motor shaft for rotating the disc; supporting wheels rotatably connected to the head parts and coacting with the skids for supporting the mower; a handle member pivotally connected to the head parts; and lugs located on the head parts for limiting the movement of the handle relative to the frame.

2. In a mower, a frame having upwardly extending head parts located at one end of the frame; a shell secured to the head parts; a bearing shaft secured to the frame; a brace member secured to the shell and to the bearing shaft; a cutter disc rotatably supported on the bearing shaft and above the frame and having projecting cutting blades; a cover part adjustably secured to the head parts and to the brace member for enclosing the shell and the brace member; a motor mounted on the cover part and having a shaft extending downwardly into the cover part and between the head parts; and means located in the shell for connecting the shaft of the motor with the disc for rotating the disc.

3. In a mower, a frame; one end of the frame having upwardly projecting head parts; a shell secured to the head parts; a brace member secured at one end to a central part of the shell; a bearing shaft secured to a central part of the frame and to an end of the brace member; a cutter disc rotatably supported on the bearing shaft and located above the frame and having projecting cutting blades; a motor having a shaft located between the head parts; a belt located in the shell for connecting the shaft of the motor with the disc for rotating the disc; an adjustable cover member secured to the said head parts and to the brace member for enclosing the shell and for supporting the motor; the frame having a forwardly extending skid part; stub axles secured to the head parts; supporting wheels rotatably connected to the stub axles; a handle member pivotally connected to the stub axles; and lugs located on the head parts in position to limit the movement of the handle to tilt the mower.

BERTIS H. URSCHEL.